Nov. 5, 1946.　　　J. S. PECKER　　　2,410,609
AIRCRAFT ROTOR WING CONSTRUCTION
Original Filed July 17, 1943　　3 Sheets-Sheet 1
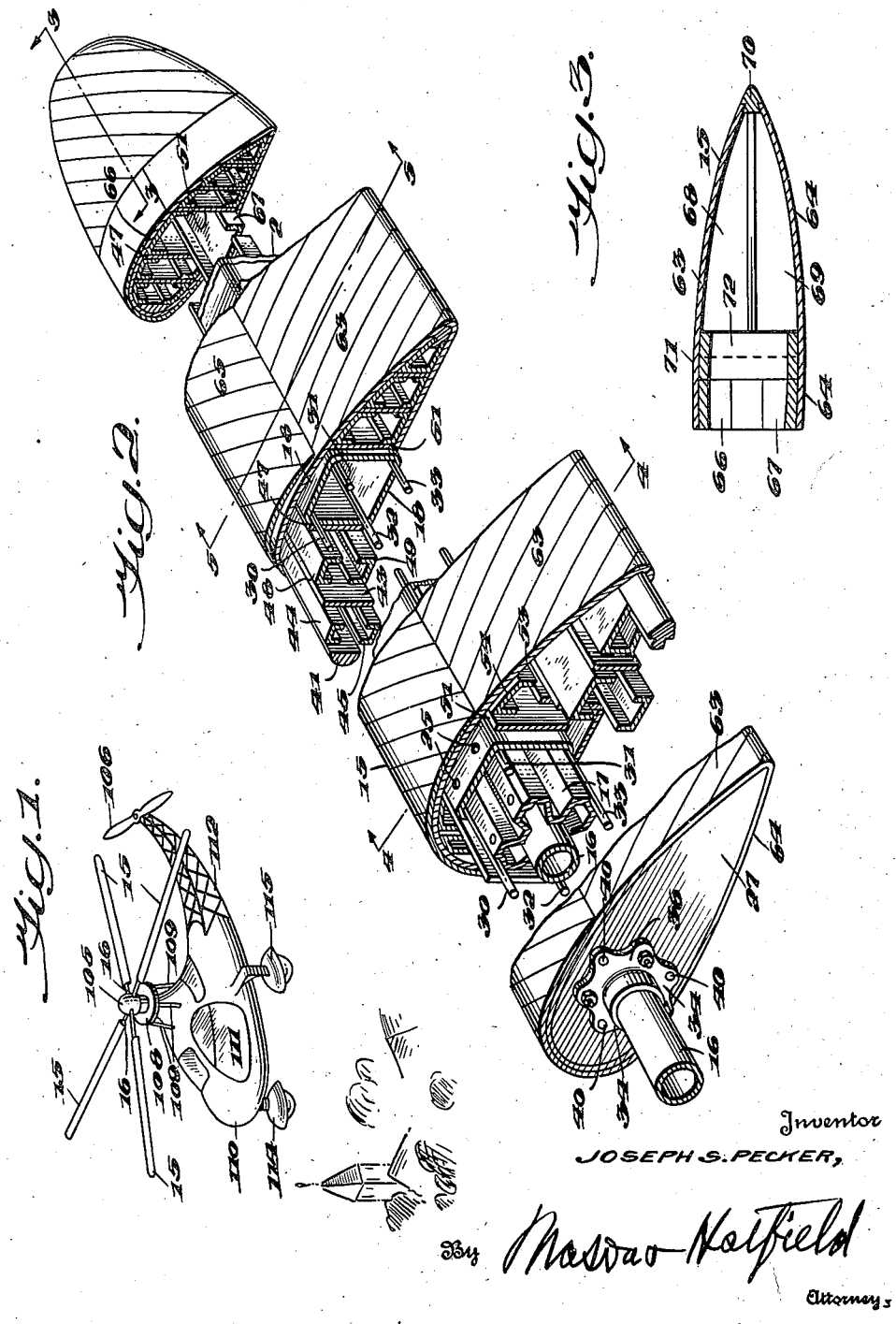
Inventor
JOSEPH S. PECKER,
By Nasvao Hatfield
Attorneys

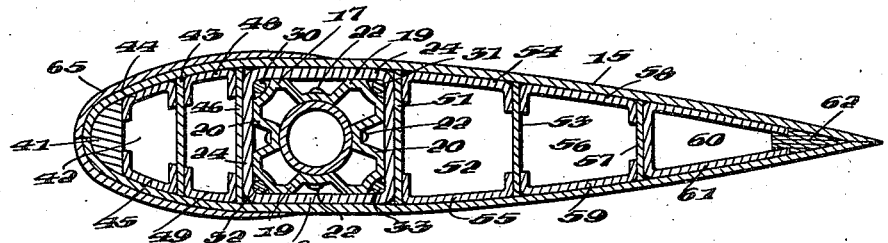
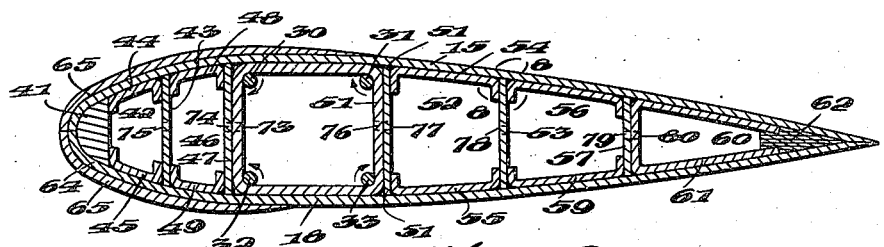
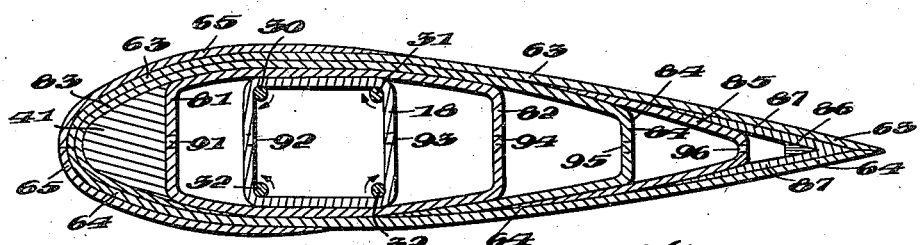
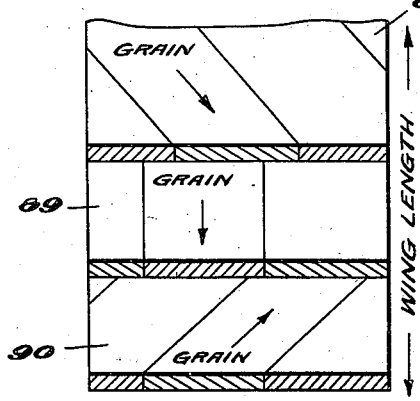
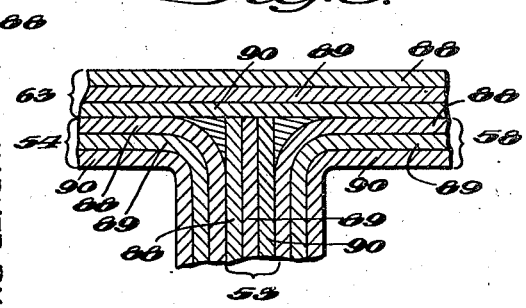
Inventor
JOSEPH S. PECKER,

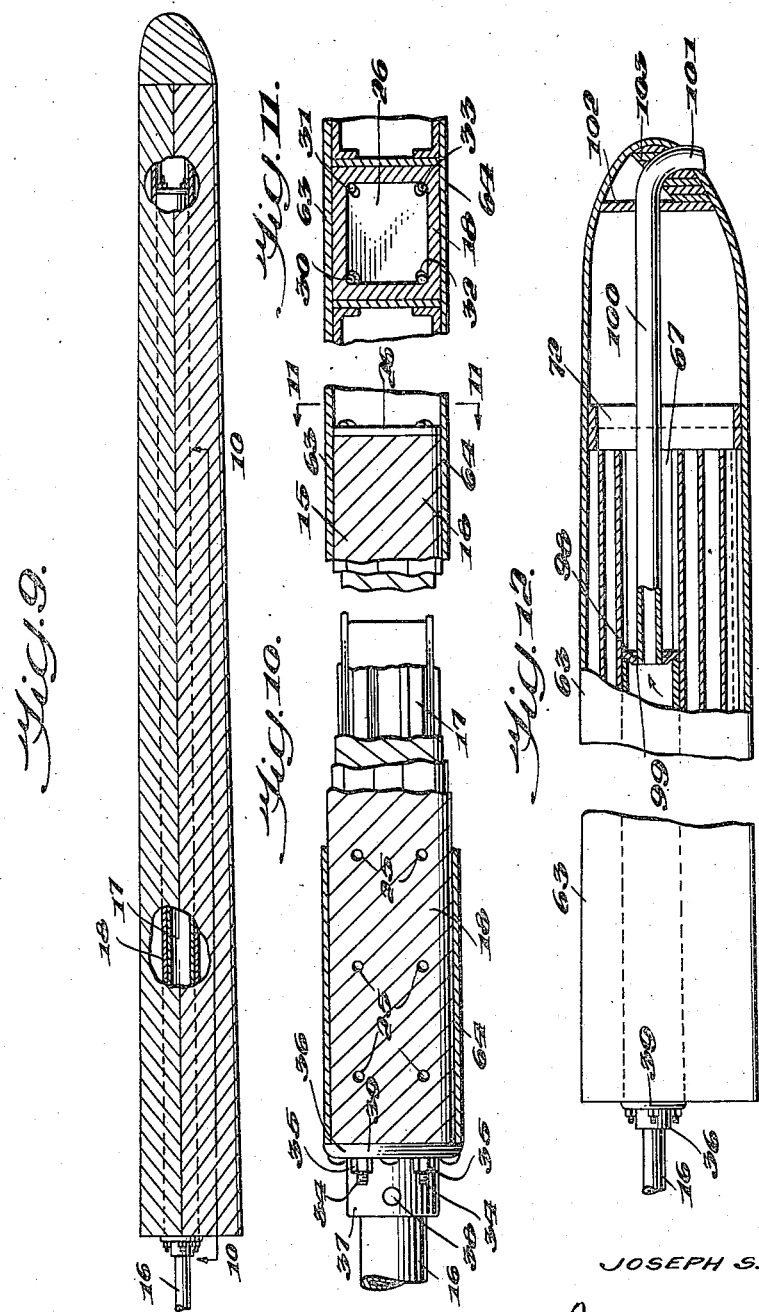

Patented Nov. 5, 1946

2,410,609

UNITED STATES PATENT OFFICE 2,410,609

AIRCRAFT ROTOR WING CONSTRUCTION

Joseph S. Pecker, Philadelphia, Pa.

Original application July 17, 1943, Serial No. 495,197. Divided and this application December 31, 1943, Serial No. 516,476

16 Claims. (Cl. 244—123)

This invention relates to the construction of a rotor wing for aircraft such as used on helicopters and autogyros, and the construction may be found to be adapted for use in other wing surfaces and/or control surfaces of aircraft, although it is particularly adapted for rotor wing construction for aircraft.

An object of the invention is the provision of a plurality of blades which comprise the rotor wing, of plywood or other non-metallic material, although the construction of some or all of the parts of the blade of metallic material is not excluded. Where plywood is used the grain direction of the several plies would be at angles to each other.

Another object of the invention is to provide an aircraft rotor wing construction of plywood or similar material which is of semi-rigid construction, and which is so braced whereby to secure utmost strength for weight, particularly in the direction of the component of centrifugal forces applied to the rotor blade during rotation.

A further object of the invention is to provide a rotor wing comprising a plurality of blades, each of which is cellular in form with the walls of the cells and the lengthwise dimension of all cell forming members disposed longitudinally of the rotor blade.

An additional object of the invention is to provide a rotor wing the blades of which are of hollow construction, and whereby great strength for weight is secured by the provision of longitudinal extending tension members and box spars.

Additional objects will be found hereinafter throughout the specification, reference being had to the accompanying drawings.

In the drawings:

Figure 1 is a view in perspective, of an aircraft of the type to which the rotor wing construction of this invention is particularly adapted;

Figure 2 is a view in perspective, and partly broken away, of a preferred form of this invention;

Figure 3 is a section of the wing tip taken substantially on the line 3—3 of Figure 2;

Figure 4 is an enlarged section taken substantially on the line 4—4 of Figure 2;

Figure 5 is an enlarged section taken substantially on the line 5—5 of Figure 2;

Figure 6 is a view similar to Figure 5 but showing a modified wing construction according to this invention;

Figure 7 is a fragmentary plan view of plywood from which the wing constructions of this invention are preferably molded, and indicating by arrows the grain direction in the veneer of the respective plies thereof;

Figure 8 is an enlarged fragmentary section taken at the portion 8—8 of Figure 5;

Figure 9 is a plan view of the wing shown in Figure 2 partly broken away to illustrate the approximate extent of the metal spar and surrounding molded box spar;

Figure 10 is an enlarged longitudinal section taken substantially on the line 10—10 of Figure 9, and broken away for clearness of disclosure;

Figure 11 is a fragmentary section taken substantially on the line 11—11 of Figure 10, and Figure 12 is a plane view, partly broken away and partly in section of an adaptation of the wing to jet drive.

Referring to the drawings in detail, the wing construction 15 illustrated in Figure 1 to 5, and 9 to 11, is supported by a metal stub spar 16 extending substantially one-third the wing length.

Coextensive with that portion of the spar which extends within the wing is the spar connector sleeve, generally designated 17, by means of which the metal stub spar 16 is connected with the molded box spar 18. The connector sleeve 17 is preferably crenelated for ultimate strength for weight in torsion and is made up of pairs of angles 19, 20 which form a continuous enclosing sleeve for the stub shaft 16 by reason of having their edges welded together at 21, Figure 4.

As shown in Figures 2 and 4, this connector sleeve 17 presents two separated, elongated flat surfaces 24 to the inner surface of each wall of the rectangular molded box spar 18. These surfaces are secured to the abutting box spar surfaces by bonding, or for instance, by rivets such as 25, Figure 2. In this manner, the connector sleeve 17 connects the metal stub spar 16 with the overlying or surrounding portion of the molded box spar 18.

This box spar 18, as shown in Figures 2 and 9, is substantially coextensive with the length of the wing tip proper and terminates adjacent the joint between the wing proper and the wing tip. It is hollow throughout and the outer end is closed by the metal end plate 26, Figures 2, 10 and 11. The other end of the box spar 18 is secured to the connector sleeve 17, as described above, and through the sleeve 17 to the metal stub spar 16. The inner ends of the connector sleeve 17 and box spar 18 closely engage the inner surface of the inner end wall 27 of the wing proper.

Extending through suitable apertures provided in the box spar end plate 26 are four tension members 30, 31, 32 and 33. The outer ends of these tension members are fixedly secured to the end plate 26. The four tension members extend throughout the hollow length of the box spar 18 adjacent its corners and terminate inwardly in screw portions or screw threaded portions 34 provided with nuts 35 by means of which they may be adjusted to stress the box spar 18, and through the box spar 18, the entire wing 15.

The bracket 36 has its cylindrical portion 37 fixed to the metal stub spar 16 in suitable manner, as by rivets 38, and the flange or foot portion 39 thereof is secured in suitable manner, as by rivets 40, to the inner end wall 27 of the wing proper. Suitable apertures are provided in the flange or foot portion 39 to receive the screw portions or screw threaded portions 34 of the tension members 30—34.

Thus, the spar structure which forms in effect the backbone of the rotor blade, comprises a metal stub spar extending throughout a minor portion only of the wing length, a crenelated metal connector sleeve surrounding and fixed to the portion of the stub spar within the wing, a laminated tapering box spar extending from the inner end of the wing substantially throughout its length and surrounding and attached to the connector sleeve, and a plurality of tension members, preferably cables, extending throughout the length of the box spar and adjustable in length for pre-stressing and compensating for shrinkage or warping. The stub spar, connector sleeve, and tension members are all disposed substantially longitudinally of the rotor blade or wing, as are the walls of the box spar, whereby to secure utmost strength for weight in the direction of the components of centrifugal forces applied to the rotor blade during rotation.

The wing structure surrounding the spar structure or backbone, is of cellular form with the walls of the cells and the lengthwise dimension of all cell-forming members disposed longitudinally or axially of the rotor bade. As shown in Figures 2, 4 and 5, the nose stringer or nose piece 41 is laminated with a flat rear surface and curved forward surface, the laminations being transverse.

The first longitudinal cell is designated 42 and is formed by the nose stringer 41, vertical stringer or wall 43, and a pair of stringers in the form of angles of substantially U-section designated 44 and 45, with their legs or side flanges bonded respectively to the rear, flat surface of the nose stringer 41 and the forward surface of the wall or stringer 43.

The second cell is designated 46 and is formed by the stringer or wall 43, the stringer or wall 47 and a pair of stringers or angles 48 and 49, similar to the above described stringers or angles 44 and 45, and similarly disposed with respect to their cell, i. e., the legs or side angles are bonded respectively to the rear surface of the wall 43 and the forward surface of the wall 47. The wall 47 closely engages the forward wall of the box spar 18 and is bonded thereto.

A similar wall or vertical stringer 51 closely engages the rear wall of the box spar 18, and is bonded thereto in similar manner. The third cell 52 is formed by the aforementioned vertical stringer or wall 51, a second vertical stringer or wall 53 and a pair of similar oppositely disposed stringers or angles 54 and 55 with their legs or vertical side flanges bonded respectively to the stringers or walls 51 and 53.

The fourth cell is designated 56 and is formed by the aforementioned stringer or wall 53, the vertical stringer or wall 57 and a pair of oppositely disposed stringers or angles 58 and 59, with their vertical legs or flanges bonded to the vertical stringer or wall 57.

The remaining or rearmost cell 60 is formed by a stringer or angle 61 and the tailpiece or trailing edge piece or stringer 62. The angle 61 is of substantially triangular section with its leg portions or flanges disposed generally horizontally and the intermediate portion arranged vertically, in close contact with the stringer or wall 57, and bonded thereto. As shown in Figures 4 and 5, the forward end of the tail piece 62 is provided with steps for receiving the ends of the flanges of the angle 61, which are bonded therein.

The main skin of the wing is formed in halves, the upper half 63 terminating forwardly adjacent the mid-portion of the curved forward surface of the nose piece or stringer 41, and terminating rearwardly adjacent the mid-portion of the curved outer surface of the tail piece or stringer 62. The lower half 64 of the main skin has its edges in engagement with the edges of the upper half 63. In order to protect the forward seam at the forward junction of the skin halves 63 and 64, and in order to secure free flow of air over the nose portion of the wing, a nose skin, buffer skin, or nose skin covering 65 is provided, which covers the nose portions of the skin halves 63 and 64, and the seam at their junction, and which terminates roughly adjacent the mid-point of the box spar 18 both upwardly and downwardly, as shown in Figures 4 and 5 of the drawings.

Beyond the outer end of the box spar 18 and the end plate 26, secured thereto, are a pair of oppositely disposed oppositely directed stringers or angles, or substantial U-section, designated 66 and 67, with their flanges or legs bonded respectively to the longitudinal stringers or walls 47 and 51.

As shown in Figures 3 and 12, all of the above described stringers or walls and angles terminate just short of the ends of the skin 63, 64. The ends of the skin halves 63 and 64 closely engage the edges of the complementary halves 68 and 69 which form the wing tip. The curved edges of these complementary half skins or tip halves are received in steps provided in the tip edge stringer 70 for this purpose. A substantially annular connector 72 underlies the joint 71 between the skins of the tip and wing proper, which are bonded thereto as shown in Figures 3 and 12.

As shown in Figure 5, apertures 73, 74 and 75 may be provided for supplying hot air injected in suitable manner into the box spar 18 into the forward cells 42 and 46, for de-icing. Where the course of air is omitted, such apertures provide for insulation and venting, so that distortion of the wing in operation occurs without building up of internal pressure. Like apertures 76, 77, 78, 79 and 80 provide, when desired, for ventilation and venting of the cells 52 and 56 and 60.

In the modification illustrated in Figure 6, the spar structure is of the same construction as in the embodiment illustrated in Figures 2 to 5, and 9 and 10. The skin is similar, being formed by the skin halves 63 and 64 covered adjacent the leading edge by the buffer skin or protective skin 65. The wing tip construction is the same as illustrated in Figures 2 and 12, and is secured to the skin proper 63 and 64 in the same manner. However, the vertical stringers or walls 43, 47, 51, 53 and 57, and the angles 44, 45, 48, 49, 54, 58, 59 and 61 are omitted and the trailing edge stringer or tail piece 62 is modified as will hereinafter appear.

In the modified structure a plurality of telescopically arranged longitudinal stringers or angles of substantial U-section are substituted for the above enumerated stringers and angles, and perform the function performed thereby. Surrounding the oppositely disposed angles 81 and 82 with their flanges abutting substantially at the middle of the upper and lower outer engaged surfaces of the box spar 18, and with the intermediate portions joining the flanges disposed substantially vertically, are a second pair of like, oppositely disposed, angles 83 and 84, which overlap the aforesaid angles 81 and 82, and are bonded thereto, the forward angle 83 having its central portion complementary with and closely surrounding the forward stringer or nose piece 41 to which it is bonded. Rearwardly of the angle 84 is a similar angle 85 of slightly smaller size with its flanges or legs abutting and bonded to the flanges of the angle 84. The trailing edge stringer or tail piece 86 is of reduced size and the outer curved surfaces thereof are surrounded by the rearmost angle 87 which has its legs or flanges engaging and bonded to the legs or flanges of the angle 85. The half skins 63 and 64 are bonded to the engaged leg portions or flanges of the angles 81—85, 87 in a manner which will be readily understood.

Optionally, the wing structure shown in Figure 6 may be provided with apertures or vents for the purposes enumerated above. These apertures may comprise the apertures 91 in the angle 81 providing communication between the first and second cells, the apertures or vents 92 in the forward vertical wall of the box spar 18 and providing communication between the second cell and the interior of the box spar. The aperture 93 in the rearward vertical wall of the box spar may provide communication between the box spar and the third cell, the apertures 94 in the angle 82 between the third and fourth cells, the apertures 95 in the angle 84 between the fourth and fifth cells, and the apertures 96 in the angle 85 between the fifth and sixth or rearmost cell.

While the skins, stringer, angles and box spar are capable of production from various molded materials either laminated or otherwise, a preferred material is illustrated in Figures 7 and 8, and comprises three-ply plywood composed of three layers or sheets of veneer bonded together. For ultimate strength the plies are arranged so that the grain direction of the first or outer ply 88 is substantially 45 degrees from the longitudinal axis of the wing, spars, stringers and skins, the second or intermediate ply 89 has its grain direction substantially parallel with the longitudinal direction of the wing, and the third or inner ply 90 had its grain direction at 45 degrees from the longitudinal direction or axis on an inclination opposite that of the first ply or substantially at a right angle to the grain direction therein.

As shown in Figures 2, 7 and 10, the wood veneer in each layer may comprise narrow strips cut in the grain direction with their edges glued or bonded together in a butt-joint to form sheets of substantial width.

While the sheets of three-ply plywood forming the respective skins, stringers, walls and angles have been shown as possessed of substantial thickness, this is an exaggeration made solely in the interest of clearness and convenience of illustration and disclosure, it being clearly understood by those skilled in the art that the thickness of the plywood and constituent veneer sheets will vary widely with the strength of the wood. It is also well recognized by those skilled in the art that extremely thin plywood sheets provide strength amply adequate for the purpose here intended, and to withstand the forces and stresses to which they may be subjected.

As shown in Figure 12, the wing constructions illustrated in the drawings and described above, are readily adaptable to jet drive for the rotor wing. When this is found desirable, the box spar end plate 98, Figure 12, is provided with an aperture 99 into which is inserted and rigidly secured, the inner end of an air-pipe 100, provided at its outer end with a nozzle 101 disposed at the desired angle, and supported by a transverse rib 102 and angular block 103, provided in the wing tip adjacent its outer end. If desired, the air pipe 100 may be rotatably secured in the box spar end plate 98, and suitable controls of known type provided for rotating the air pipe to vary the angle of the nozzle 101 with respect to the wing proper. Compressed air for driving or initiating rotation of the wing may be injected through the metal stub spar, for instance, into the interior of the box spar, whence it flows through air pipe 100 and nozzle 101 to initiate rotation of the wing or drive the wing. In this embodiment, no vents or apertures are provided between the interior of the box spar 18 and the respective wing cells from which it is sealed off for obvious reasons.

In Figure 1 is illustrated a rotary wing aircraft of a type to which blades or rotor wings constructed according to this invention, are particularly adapted. As shown, the metal stub spars 16 carrying blades or rotor wings 15 are rotatably secured in a hub 105, which is rotatably driven by a rotor shaft (not shown), from the engine of the craft (also not shown), which concurrently drives the tail propeller 106 through which stabilization, guide and control of the craft is mainly secured. Through linkages including rods 107, the respective stub spars 16 are connected with the swash plate 108, which, in turn, is manually controlled by the pilot through controls including the control rods 109. Through positional control of the swash plate, the pitch of the respective blades or rotor wings, and the angle of attack or angle of incidence of the rotor wing, are controlled as desired.

The craft illustrated in Figure 1 is a helicopter of the closed fuselage type, comprising a closed fuselage 110 with door 111, provided with an openwork boom or tail spar 112 for supporting the tail propeller 106 in suitable location with respect to the rotor wing or wing system 15, 16, 105—109, and for supporting the tail propeller drive shaft (not shown). It is of course to be understood that the rotor wing constructions herein illustrated, and above described, are as readily adaptable to all types of known rotary wing aircraft, including the free wing or flapping wing type of craft known in the art as Autogiros.

Suitable landing gear for operation on land or water is of course provided, and may comprise the tricycle landing gear shown, which comprises suitable mounted forewheel unit 114 and side wheel units 115 suitably located for attainment of ultimate stability and security.

In the specification I have described the skin as being composed of plywood, but it is to be expressly understood that I may substitute any other skin material. For instance the several layers shown in Figure 8 may be of cloth, which cloth layers may be suitably impregnated with a substance to give them body. Or I may use one or more layers of plywood with other layers of a different material such as cloth.

This application is a division of my application Serial No. 495,197, filed July 17, 1943, now Patent No. 2,362,601.

It will be understood that the above description and accompanying drawings are for illustrative purposes only, and that I do not desire to be limited in the practice of this invention except as defined by the appended claims.

What is claimed is:

1. In a rotor blade, a skin for said blade consisting of a plurality of laminations, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

2. In a rotor blade, a skin for said blade consisting of a plurality of plywood laminations, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

3. In a rotor blade, a skin for said blade consisting of a plurality of plywood laminations with the grain of at least one of the laminations extending at an angle to the longitudinal axis of said blade, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

4. In a rotor blade, a skin for said blade consisting of a plurality of plywood laminations with the grain of at least one of the laminations extending at an angle to the longitudinal axis of said blade and at an angle to the grain of another lamination, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

5. In a rotor blade, a skin for said blade, said skin consisting of a plurality of plywood laminations with the grain of certain of said laminations extending at substantially right angles to each other and at substantially a 45 degree angle to the longitudinal axis of said blade, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

6. In a rotor blade, a skin for said blade, said skin consisting of at least three plywood laminations with the grain of certain of said laminations extending substantially at right angles to each other and at substantially a 45 degree angle to the longitudinal axis of said blade and the grain of a third lamination extending substantially longitudinally of the blade, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

7. In a rotor blade, a skin for said blade, said skin consisting of at least three plywood laminations with the grain of certain of said laminations extending substantially at right angles to each other and substantially at a 45 degree angle to the longitudinal axis of the blade and with the grain of a third lamination extending substantially parallel with the longitudinal axis of said blade, said third lamination lying between said 45 degree angle laminations, and means for rigidly supporting said skin, said supporting means including a plurality of cell members extending longitudinally of the axis of said blade, one of said cell members being located substantially centrally of said blade, means for mounting said rotor blade comprising means non-rotatably fixed with relation to said cell member, said means being connected to the interior of said cell member and being co-extensive therewith, said other cell members being located on said opposite sides of said centrally located cell member with at least one of said other cell members rigidly connected at one side of said centrally located cell member.

8. In a rotor blade, a skin for said blade consisting of a plurality of laminations, and means for rigidly supporting said skin including a box spar having vertical walls extending longitudinally of said blade and a plurality of pairs of angle members of U-section, longitudinal stringers separating the angle members of each pair from each other and each pair from another pair of angle members, said skin having upper and lower surfaces, the vertical walls of said spar serving to space said surfaces.

9. In a rotor blade, a skin for said blade consisting of a plurality of laminations, and means for rigidly supporting said skin including a box spar having vertical walls extending longitudinally of said blade and a plurality of angle members of U-section, longitudinal stringers separating the angle members of each pair from each other and each pair from another pair of angle members, said skin having upper and lower surfaces, the vertical walls of said spar serving to space said surfaces, said spar having substantially horizontal surfaces, and means for attaching the same to the said upper and lower surfaces of said skin.

10. In a rotor blade, a box spar extending longitudinally and substantially centrally thereof, a plurality of pairs of angle members of U-section, longitudinal stringers separating the angle members of each pair from each other and each pair from another pair of angle members, several of said pairs of angle members and stringers forming longitudinally extending cells located on opposite sides of said box spar, a nose stringer forming the side wall of one of said cells, a rearmost cell formed of a three sided member and a trailing edge piece, and a skin comprising upper and lower skin halves bonded to said nose stringer, the upper and lower surfaces of said cells, box spar and trailing edge piece, each skin half comprising a multi-layer plywood section having layers the grain of which extends at angles to each other and to the longitudinal axis of the rotor blade.

11. In a rotor blade, means forming a plurality of cells extending longitudinally of the blade axis, a nose stringer having a rear wall forming a side of one of said cells the upper and lower walls of said last named cell having side flanges which lie against the rear wall of said nose stringer, a skin, means attaching said skin to the upper and lower surfaces of said cells, and to said nose stringer, said skin being composed of a bonded multi-layered plywood.

12. In a rotor blade, a box spar extending longitudinally and substantially centrally thereof, a plurality of pairs of angle members of U-section, longitudinal stringers separating the angle members of each pair from each other and each pair from another pair of angle members, several of said pairs of angle members and stringers forming longitudinally extending cells located on opposite sides of said box spar, a nose stringer forming the side wall of one of said cells, a rearmost cell formed of a three sided member and a trailing edge piece, and a skin comprising upper and lower skin halves bonded to said nose stringer, the upper and lower surfaces of said cells, box spar and trailing edge piece.

13. In a rotor blade, a box spar extending longitudinally and substantially centrally thereof, a plurality of pairs of angle members of U-section, longitudinal stringers separating the angle members of each pair from each other, the sides of said box spar, angle members and stringers being composed of multi-layered plywood construction and bonded to each other.

14. In a rotor blade, a box spar extending longitudinally and substantially centrally thereof, a plurality of pairs of angle members of U-section, longitudinal stringers separating the angle members of each pair from each other and each pair from another pair of angle members, several of said pairs of angle members and stringers forming longitudinally extending cells located on opposite sides of said box spar.

15. In a rotor blade, a box spar extending longitudinally and substantially centrally thereof, a plurality of pairs of angle members of U-section, longitudinal stringers separating the angle members of each pair from each other and each pair from another pair of angle members, several of said pairs of angle members and stringers forming longitudinally extending cells located on opposite sides of said box spar, and a nose stringer forming the side wall of one of said cells.

16. In a rotor blade, a box spar extending longitudinally and substantially centrally thereof, a plurality of pairs of angle members of U-section, longitudinal stringers separating the angle members of each pair from each other and each pair from another pair of angle members, several of said pairs of angle members and stringers forming longitudinally extending cells located on opposite sides of said box spar, a nose stringer forming the side wall of one of said cells, and a rearmost cell formed of a three sided member and a trailing edge piece.

JOSEPH S. PECKER.